J. H. SMITH,

Assignor of one-third interest to E. C. STEARNS.

Hollow-Auger.

No. 9,130. Reissued Mar. 30, 1880.

WITNESSES:

E. Laass

C. Bendipen

INVENTOR:

J. Heston Smith per Duell, Laass & Hey attorneys

N. PETERS, PHOTO-LITHOGRAPHER, WASHINGTON, D. C.

UNITED STATES PATENT OFFICE.

J. HESTON SMITH, OF THREE TONS, PENNSYLVANIA, ASSIGNOR OF ONE-THIRD INTEREST TO EDWARD C. STEARNS.

HOLLOW AUGER.

SPECIFICATION forming part of Reissued Letters Patent No. 9,130, dated March 30, 1880.

Original No. 56,459, dated July 17, 1866. Application for reissue filed December 31, 1879.

DIVISION A.

*To all whom it may concern:*

Be it known that I, J. HESTON SMITH, of Three Tons, Montgomery county, in the State of Pennsylvania, have invented certain new and useful Improvements in Hollow Augers for Cutting Tenons upon Wagon-Spokes and Similar Articles; and I declare the following to be such a full, clear, and exact description of the same as to enable any person skilled in the art to which it appertains to make and use the same.

My invention relates to that class of hollow augers which are adjustable to cut tenons of various dimensions; and it consists of a hollow auger having a cutter-carrying jaw and a gage-jaw adjusted in their operative position by a right-and-left screw.

It also consists in the combination of a cutter-carrying jaw and a gage-jaw bearing, respectively, diametrically and tangentially against the tenon operated on, and a right-and-left screw of differential threads arranged to move the said jaws with different speed toward and from the center of the auger and simultaneously bear against the tenon operated on.

It also consists in the combination, with a hollow auger having its jaws adjusted in their operative position by a right-and-left screw of differential threads, of a lug rigidly connected to the auger-frame and embracing the neck of the said screw, so as to brace the same and prevent its movement longitudinally.

It also consists in the combination, with the aforesaid jaws, of clamp-bolts passing through the same and securely retaining them in their desired position.

It furthermore consists of a T-shaped hollow auger-stock provided with a sliding shank and cutter-carrying and gage jaws adjusted in their operative position by a right-and-left screw; and it furthermore consists in the combination, with a cutter-carrying jaw and a gage-jaw sliding respectively on guideways transverse to the axis of the auger, of a graduated scale on the cutter-head of the auger, whereby the adjustment of the jaws is greatly facilitated.

For a more specific description of my invention, reference is had to the accompanying drawings, wherein—

Figure 1:
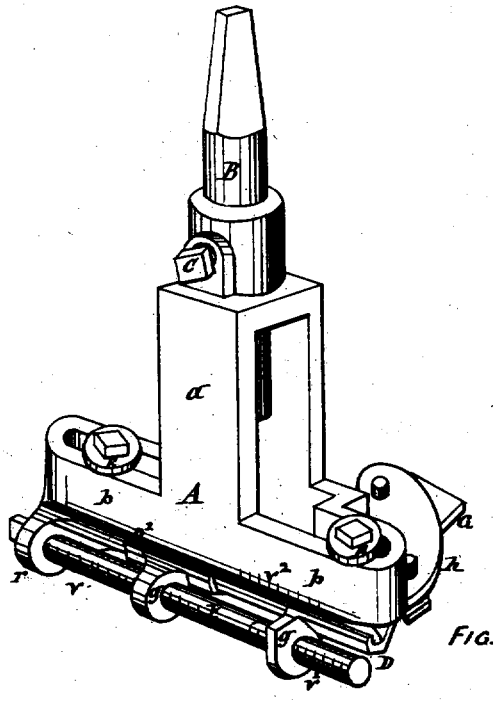
Figure 2:
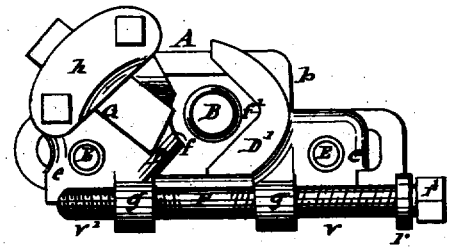
Figure 3:
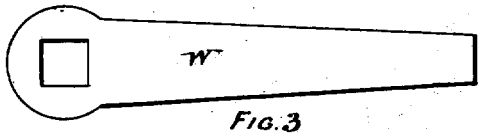

Figure 1 is a perspective view of my improved auger inverted, showing its general construction; Fig. 2, a plan view of the cutter-head of the tool, and Fig. 3 a plan view of a wrench adapted for operating the right-and-left adjusting-screw.

Similar letters of reference indicate corresponding parts.

A represents the stock or frame of the auger, made T-shaped and having both its main trunk *a* and the right-angled arms *b b* slotted, the latter of which forms the cutter-head of the tool. On top of the arms *b b* of the auger-stock are formed parallel guideways, upon which the jaws D D′ are moved to approach and recede from each other at right angles to the axis of the auger by means of a screw-bolt, F, having right and left threads *v v′*, working, respectively, in nuts *g g*, which project from the side of the jaws and are integral therewith. The jaw D faces the gage-jaw D′, with a projection formed of convergent sides terminating with a segmental recess, *f*, which is designed to bear diametrically against the tenon operated on.

G is the knife or cutter of the auger, set with one corner of its cutting-edge projecting over the edge of the recess *f*, and secured in its position by a plain-faced strap or cap, *h*, which is applied across the shank of the cutter and clamped to the jaw D by screws passing through the strap and jaw at opposite sides of the cutter.

The gage-jaw D′ has a V-shaped recess, *f′*, facing the cutter-carrying jaw and forming tangential bearings against the spoke operated on, and, in conjunction with the diametrical bearing of the other jaw, insures a perfectly round and true tenon of the desired size.

To compensate for the difference in the travel required to bring the tangential and diametric bearing-jaws simultaneously against the tenon operated on, and to automatically center the same at any desired adjustment, the threads of that part of the screw-shaft F which carries the tangential-bearing gage-jaw D′ is made of a greater pitch than that which carries the other jaw.

In order to maintain the faces of the jaws concentric with the axis of the auger, a rigid lug, $r$, projecting from the side of the cutter-head, embraces the neck of the screw-shaft F back of its head $r'$, and thus prevents its movement longitudinally, and at the same time braces it against lateral strain.

The jaws D D′ are provided with a rearward extension or flange, $e$, having a screw-threaded eye, which is engaged by a bolt, E, passed from underneath the cutter-head and shouldered against the same.

By means of the bolts E the jaws D D′ are clamped upon the cutter-head and securely retained in their desired position, and the adjusting-screw F relieved of strain during the operation of the tool.

A graduated scale, $v^2$, is marked on the side of the cutter-head of the tool, as shown in Fig. 1 of the drawings, the said scale being so arranged that by bringing a suitable indicating-mark on one of the jaws in coincidence with the mark on the scale indicating the size of the tenon to be cut the jaws are set to operate correspondingly, thus dispensing with the employment of an extra rule for gaging the auger and greatly facilitating the operation.

B is the shank of the tool, having a square or angular extremity adapted for attachment to a brace-stock or lathe-chuck. The said shank slides longitudinally in a socket on the end of the auger-stock, and enters the trunk $a$ of the same central with the axis of the auger, and is secured at any desired point of its length by a set-screw, C, passing through the aforesaid socket, the inner end of the said shank serving as a stop for determining the length of tenon to be cut.

I am aware that tenon-gages have been formed in a similar manner before now, and I therefore do not claim the same, excepting in connection with and as an element of my combination.

Having thus fully described my invention, what I claim as new, and desire to secure by Letters Patent, is—

1. The combination of a cutter-carrying jaw and gage-jaw operated and adjusted on the cutter-head of a hollow-auger frame by a right-and-left screw, substantially as herein set forth and specified.

2. The combination of a cutter-carrying jaw and a gage-jaw operated and adjusted on the cutter-head of a hollow auger by a right-and-left screw having differential screw-threads, substantially as specified and described.

3. In combination with two jaws adjusted in their operative position by a right-and-left screw, a rigid lug projecting from the auger-stock and embracing the neck or smooth depression in the surface of said screw, substantially as and for the purpose set forth.

4. The combination, with a hollow-auger stock, of two jaws arranged to approach and recede from each other by rectilinear movement, one of said jaws being provided with the cutter or knife and facing the other jaw, with a projection having convergent edges terminating with a segmental recess, and the opposite jaw having a V-shaped recess facing the cutter-carrying jaw, and a right-and-left screw having differential threads engaging nuts connected with the said jaws, respectively, substantially in the manner and for the purpose specified.

5. The combination of the rectilinear guided jaws D D′, facing each other, with convergent and divergent projections, respectively, and provided with nuts $g$ $g$, the differential right-and-left screw F, and the lug $r$, the latter projecting rigidly from the auger-stock, all substantially as specified and shown.

6. The jaws D D′, provided with the flanges $e$ $e$, in combination with the securing screw-bolts E E, passing through said flanges and through the slotted frame of the cutter-head of a hollow auger, and the screw-bolt F, substantially as herein described, and for the purposes set forth.

7. In combination with the slotted cutter-head provided with parallel guideways, as described, the jaws D D′, mounted on said guideways and provided with nuts $g$ $g$, and with the enlargement or flange $e$, the right-and-left screws F, and the clamp-bolts E, substantially as and for the purpose set forth.

8. The T-shaped hollow-auger frame A, provided with sliding shank B, adjusting-jaws D D′, cutter G, and right-and-left screw-bolt F, the parts being combined and operating in the manner and for the purpose herein specified and described.

In testimony that I claim the foregoing I have hereunto set my hand, in presence of two attesting witnesses, this 4th day of October, A. D. 1879, at Three Tons, Montgomery, Pennsylvania.

J. HESTON SMITH.

Witnesses:
JAMES H. WOLFE,
FRANK KANE.